(12) United States Patent
Shouji

(10) Patent No.: US 9,425,722 B2
(45) Date of Patent: Aug. 23, 2016

(54) ELECTRIC MOTOR CONTROL DEVICE AND ELECTRIC MOTOR CONTROL METHOD

(71) Applicant: NISSAN MOTOR CO., LTD., Yokohama-shi, Kanagawa-ku (JP)

(72) Inventor: Mitsuhiro Shouji, Yamato (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/384,264

(22) PCT Filed: Mar. 8, 2013

(86) PCT No.: PCT/JP2013/056484
§ 371 (c)(1),
(2) Date: Sep. 10, 2014

(87) PCT Pub. No.: WO2013/137146
PCT Pub. Date: Sep. 19, 2013

(65) Prior Publication Data
US 2015/0061557 A1 Mar. 5, 2015

(30) Foreign Application Priority Data
Mar. 14, 2012 (JP) .................. 2012-057741

(51) Int. Cl.
*H02P 6/08* (2016.01)
*H02P 29/00* (2016.01)
*H02P 21/00* (2016.01)

(52) U.S. Cl.
CPC ............. *H02P 6/08* (2013.01); *H02P 21/0089* (2013.01); *H02P 29/0066* (2013.01)

(58) Field of Classification Search
CPC ........................................................ H02P 6/08
USPC ................................. 318/400.15, 400.01, 700
See application file for complete search history.

(56) References Cited

U.S. PATENT DOCUMENTS 5,652,495 A * 7/1997 Narazaki ............. H02P 21/0089
 318/716
7,443,127 B2 * 10/2008 Okazaki ............. B60L 11/1803
 318/139
7,960,930 B2 6/2011 Sato
(Continued)

FOREIGN PATENT DOCUMENTS

JP 09-051700 A 2/1997
JP 2002-369598 A 12/2002
(Continued)

*Primary Examiner* — David S Luo
(74) *Attorney, Agent, or Firm* — Foley & Lardner LLP

(57) ABSTRACT

An electric motor control device includes: a motor constant generator configured to generate a motor constant by using a temperature; a current control unit configured to generate a current command value to an electric motor based on the motor constant and a torque command value and execute a current control mode; a voltage phase control unit configured to calculate a torque estimation value of the electric motor and execute a voltage phase control mode in which a feedback operation is performed for a voltage phase based on the difference between the torque estimation value and the torque command value; and a control mode switching unit configured to switch to the voltage phase control mode in a high rotation area where a flux weakening control is performed. The torque estimation value is calculated using the motor constant common to generation of the current command value in the current control mode.

10 Claims, 5 Drawing Sheets

(56) References Cited

U.S. PATENT DOCUMENTS

| | | | |
|---|---|---|---|
| 8,013,565 B2* | 9/2011 | Miura | G01K 7/42 318/473 |
| 8,836,253 B2* | 9/2014 | Kato | H02P 21/141 318/400.02 |
| 2009/0237013 A1 | 9/2009 | Sato | |
| 2010/0134056 A1 | 6/2010 | Yamamoto et al. | |

FOREIGN PATENT DOCUMENTS

| JP | 2007-159368 A | 6/2007 |
|---|---|---|
| JP | 2010-142013 A | 6/2010 |
| JP | 2010-200430 A | 9/2010 |

\* cited by examiner

ELECTRIC MOTOR CONTROL DEVICE AND ELECTRIC MOTOR CONTROL METHOD

TECHNICAL FIELD

The present invention relates to a control of a system where a DC voltage supplied from a battery is converted into an AC voltage using an inverter and the AC voltage is applied to an AC motor.

BACKGROUND ART

As a method of controlling a torque of an alternating current (AC) electric motor, there are known an electric current control method and a voltage control method. As the electric current control method, for example, there is known a pulse width modulation (PWM) control in which an electric current is controlled based on a vector control. As the voltage control method, there is known a rectangular wave control in which rotation of the AC electric motor is driven by applying a rectangular wave voltage. In addition, as a control for improving an output power in a so-called flux weakening area, there is known a voltage phase control in which a torque of the AC electric motor is controlled by controlling a voltage phase depending on a difference between a torque command value and an actual torque in a rectangular wave voltage control. Furthermore, there is also known a configuration capable of switching a control method depending on a situation by providing such control methods as switchable control modes.

However, if a steady-state torque is different between the control modes, a so-called torque discontinuity is generated when the control mode switches, and this may make a driver feel uncomfortable. In JP 2007-159368A, there is disclosed a control for suppressing the torque discontinuity at the time of control mode switching. Specifically, in the voltage phase control, a torque or an electric power is estimated, and the estimated value is fed back to the voltage phase command value. Similarly, in the current control, a torque or the like is estimated, and the estimated value is fed back to the torque command value. As a result, a steady-state torque is maintained constantly regardless of the control mode.

SUMMARY OF INVENTION

However, in the technique disclosed in JP 2007-159368A, a torque feedback loop is added to the current control mode, so that a computation load increases. Although the increase of the computation load may be alleviated by setting the computation period to be longer, control performance inevitably decreases. In addition, a higher performance computation device may be employed. However, this may increase cost.

In view of the aforementioned problems, the present invention has an object to provide a technology for reducing a computation load to suppress a torque discontinuity at the time of control mode switching.

According to an aspect of this disclosure, there is provided an electric motor control device capable of executing a current control mode in which a voltage applied to the electric motor is controlled to match a current command value generated based on a torque command value and a motor constant corresponding to a temperature and a voltage phase control mode in which a feedback operation is performed for a voltage phase based on a difference between the torque command value and a torque estimation value obtained using a torque computation formula, wherein the voltage phase control mode is selected in a high rotation area where a flux weakening control is performed. In the torque computation formula used to estimate the torque in the voltage phase control mode, the same motor constant as that used to generate the current command value in the current control mode is used.

Embodiments of the present invention and merits of the present invention will be described below in detail together with the attached drawings.

DESCRIPTION OF EMBODIMENTS

Hereinafter, an embodiment of this disclosure will be described with reference to the accompanying drawings.

First Embodiment

Figure 1:
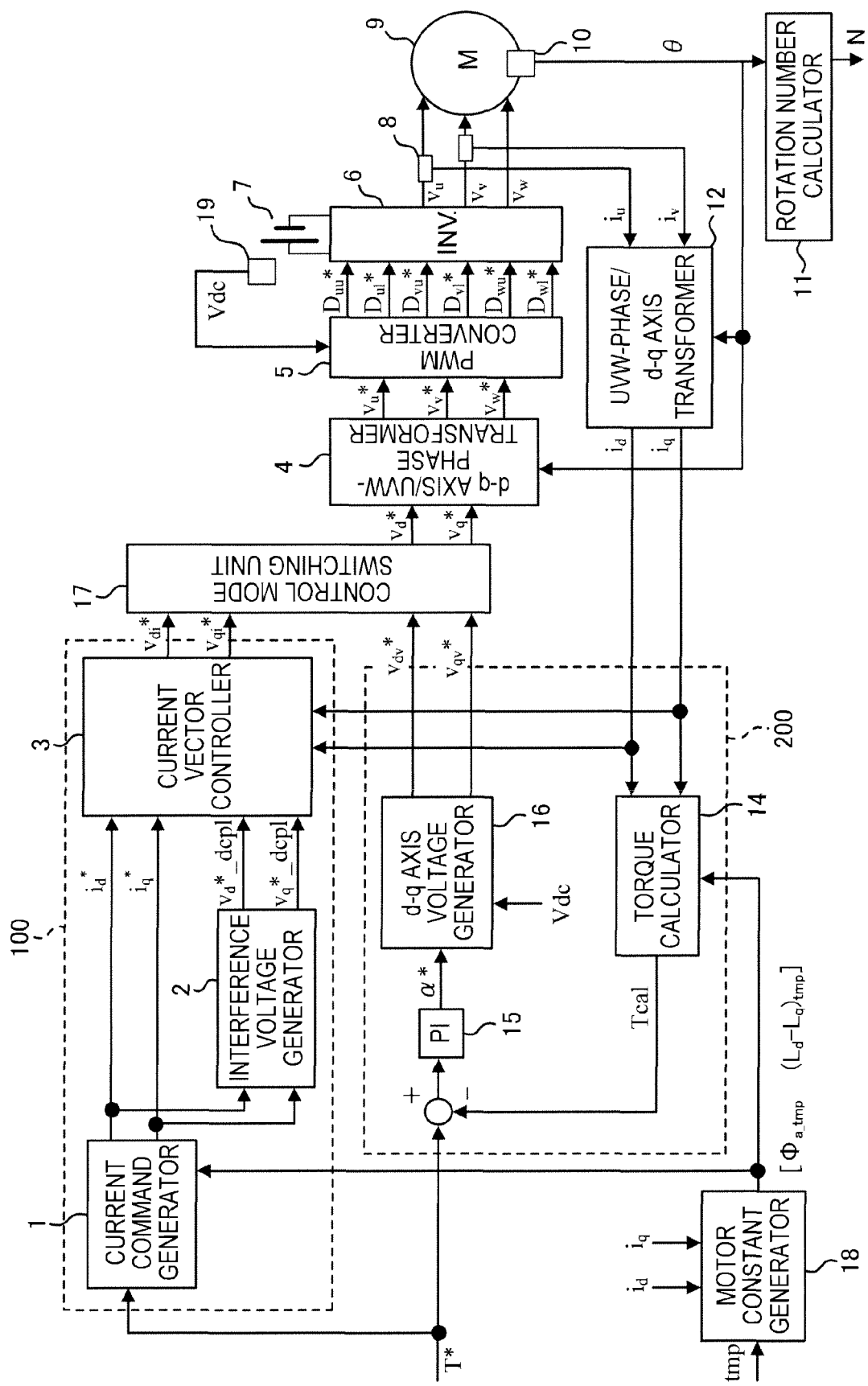
FIG. 1 is a control block diagram illustrating an electric motor control according to a first embodiment.

FIG. 1 is a control block diagram illustrating an electric motor control according to a first embodiment. This control is executed based on a flowchart described below.

The control according to the first embodiment is performed by switching between a current control mode and a voltage phase control mode depending on a driving state of an electric motor. The current control mode is a control mode performed to match a current command value based on a torque command value and a motor constant corresponding to a magnet temperature of an electric motor 9. The voltage phase control mode is a control mode in which a torque feedback operation is performed for a voltage phase based on a difference between a torque command value and a torque estimation value obtained from a torque computation formula. In addition, the mode switches to the voltage phase control mode in a high rotation area where a flux weakening control is performed.

A current control unit 100 in FIG. 1 includes a current command generator 1, an interference voltage generator 2, and a current vector controller 3. The current control unit 100 generates d-q axis voltage command values $v_{di*}$ and $v_{qi*}$ for the current control mode as described below. A voltage phase control unit 200 in FIG. 1 includes a torque calculator 14, a torque controller 15, and a d-q axis voltage generator 16. The voltage phase control unit 200 generates d-q axis voltage command values $v_{dv*}$ and $v_{qv*}$ for the voltage phase control mode as described below.

The motor constant generator 18 stores a magnetic characteristic table of the electric motor 9 created in advance and outputs a magnetic flux value $\phi_{a\_tmp}$ used in both the current control mode and the voltage phase control mode and a d-q axis inductance difference $(Ld-Lq)_{tmp}$ as a difference between the d-axis inductance and the q-axis inductance based on a predetermined magnet temperature tmp and d-q axis current detection values $i_d$ and $i_q$.

It is noted that the predetermined magnet temperature tmp is set to a detection temperature if it is possible to detect the magnet temperature. For example, the predetermined magnet temperature tmp may be fixed to 25° C. as a performance guarantee temperature.

A description will now be made for the current control unit 100.

Similar to the current control mode known in the art, the current command generator 1 receives a torque command value T*, a magnetic flux value $\phi_{a\_tmp}$, and a d-q axis inductance difference $(Ld-Lq)_{tmp}$ and outputs a d-q axis current command values $i_{d*}$ and $i_{q*}$.

The interference voltage generator 2 generates d-q axis interference voltages $v_{d*\_dcpl}$ and $v_{q*\_dcpl}$ based on the d-q axis current command values $i_{d*}$ and $i_{q*}$.

The current vector controller 3 receives the d-q axis current command values $i_{d*}$ and $i_{q*}$ and the d-q axis interference voltages $v_{d*\_dcpl}$ and $v_{q*\_dcpl}$, performs a vector current control utilizing a non-interference control and a current feedback control known in the art, and outputs the d-q axis voltage command values $v_{di*}$ and $v_{qi*}$ for the current control mode.

A description will now be made for the voltage phase control unit 200.

The torque calculator 14 receives the magnetic flux value $\phi_{a\_tmp}$, the d-q axis inductance difference $(Ld-Lq)_{tmp}$, and the d-q axis current detection values $i_d$ and $i_q$ and calculates a torque estimation value $T_{cal}$ of the electric motor 9 based on formula (1). It is noted that a factor "p" in Formula 1 denotes the number of pole pairs of the electric motor 9.

$$T_{cal} = p\{\Phi_{a\_tmp} + (L_d - L_q)_{tmp} \cdot i_d\} i_q \qquad (1)$$

The torque controller 15 receives a difference between the torque command value T* and the estimated torque $T_{cal}$ and outputs a value obtained by performing PI-amplification based on formula (2) as a voltage phase command value α*. It is noted that, in formula (2), "Kp" denotes a proportional gain and "Ki" denotes an integral gain.

$$\alpha^* = \frac{K_p s + K_i}{s}(T^* - T_{cal}) \qquad (2)$$

The d-q axis voltage generator 16 receives the voltage phase command value α*, and calculates and outputs the d-q axis voltage command values $v_{dv*}$ and $v_{qv*}$ for the voltage phase control mode based on Formula (3). In formula (3), "$V_{dc}$" denotes a battery voltage detection value detected by the DC voltage sensor 19, and "M*" denotes a modulation factor command value.

$$\begin{cases} v_{dv}^* = -\dfrac{M * V_{dc}}{\sqrt{2}} \sin\alpha^* \\ v_{qv}^* = \dfrac{M * V_{dc}}{\sqrt{2}} \cos\alpha^* \end{cases} \qquad (3)$$

As described above, the current control unit 100 generates the d-q axis voltage command values $v_{di*}$ and $v_{qi*}$ for the current control mode, and the voltage phase control unit 200 generates the d-q axis voltage command values $v_{dv*}$ and $v_{qv*}$ for the voltage phase control mode. The control mode switching unit 17 selects any one of the command values depending on the selected control mode and outputs it.

Hereinafter, a description will be made for a control common to both the control modes.

The d-q axis/UVW-phase transformer 4 transforms the d-q axis voltage command values $v_{d*}$ and $v_{q*}$ into 3-phase AC voltage command values $v_{u*}$, $v_{v*}$, and $v_{w*}$ using formula (4) based on an electric angle θ of a rotor of the electric motor 9 detected by a position detector 10.

$$\begin{bmatrix} v_u^* \\ v_v^* \\ v_w^* \end{bmatrix} = \sqrt{\dfrac{2}{3}} \begin{bmatrix} 1 & 0 \\ -\dfrac{1}{2} & \dfrac{\sqrt{3}}{2} \\ -\dfrac{1}{2} & -\dfrac{\sqrt{3}}{2} \end{bmatrix} \begin{bmatrix} \cos\theta & -\sin\theta \\ \sin\theta & \cos\theta \end{bmatrix} \begin{bmatrix} v_d^{} \\ v_q^{} \end{bmatrix} \qquad (4)$$

The PWM converter 5 performs processes known in the art, such as a dead time compensation process or a voltage use efficiency improvement process, and generates power element driving signals $D_{uu*}$, $D_{ul*}$, $D_{vu*}$, $D_{vl*}$, $D_{wu*}$, and $D_{wl*}$ of the inverter 6 corresponding to the 3-phase AC command values $v_{u*}$, $v_{v*}$, and $v_{w*}$.

A battery 7 is connected to the inverter 6. The battery voltage $V_{dc}$ is detected by the DC voltage sensor 19. The inverter 6 converts the battery voltage into the pseudo sinusoidal voltages $v_u$, $v_v$, and $v_w$ based on the power element driving signals $D_{uu*}$, $D_{ul*}$, $D_{vu*}$, $D_{vl*}$, $D_{wu*}$, and $D_{wl*}$ and outputs the result.

The pseudo sinusoidal voltages $v_u$, $v_v$, and $v_w$ are applied to the electric motor 9. The current detector 8 detects a U-phase current $i_u$ and a V-phase current $i_v$ out of overall phase currents flowing through the electric motor 9. The W-phase current $i_w$ that is not detected is obtained based on formula (5).

$$i_w = -i_u - i_v \qquad (5)$$

The UVW-phase/d-q axis transformer 12 transforms the UVW-phase currents $i_u$, $i_v$, and $i_W$ into the d-q axis current detection values $i_d$ and $i_q$ using formula (6) based on the electric angle θ of the rotor of the electric motor 9 detected by the position detector 10.

$$\begin{bmatrix} i_d \\ i_q \end{bmatrix} = \begin{bmatrix} \cos\theta & \sin\theta \\ -\sin\theta & \cos\theta \end{bmatrix} \sqrt{\dfrac{2}{3}} \begin{bmatrix} 1 & -\dfrac{1}{2} & -\dfrac{1}{2} \\ 0 & \dfrac{\sqrt{3}}{2} & -\dfrac{\sqrt{3}}{2} \end{bmatrix} \begin{bmatrix} i_u \\ i_v \\ i_w \end{bmatrix} \qquad (6)$$

The rotation number calculator 11 calculates and outputs a rotation speed N of the electric motor 9 from a change rate of the electric angle θ per hour.

A description will now be made for the effects and advantages of the configuration described above.

Since the torque of the electric motor 9 is a vector product between the magnetic flux vector and the electric current vector, an absolute value of the torque of the electric motor 9 changes as a magnet temperature changes. The current is controlled constantly in the current control mode, whereas the current is not controlled in the voltage phase control mode. For this reason, a sensitivity of the torque for a change of the magnet temperature is different depending on the control mode.

However, even in the voltage phase control mode, similar to the method used to generate the current command value in the current control mode, the torque is estimated using a motor constant (such as the magnetic flux value $\phi_{a\_tmp}$ and the d-q axis inductance difference $(Ld-Lq)_{tmp}$), and a feedback control is performed. Therefore, it is possible to improve the sensitivity of the torque as high as that of the current control mode. As a result, it is possible to reduce a difference of the steady-state torque between the current control mode and the voltage phase control mode and prevent a driver from feeling uncomfortable due to a torque discontinuity during the change of the control mode. In addition, since the torque feedback control is not executed at the time of the current control mode, it is possible to reduce a computation load.

Since the motor constant is calculated using the current detection value of the electric motor 9, it is possible to generate the motor constant corresponding to the current-dependent characteristic of the inductance of the electric motor and thus improve the torque control accuracy. Furthermore, since the motor constant is computed using the magnet temperature, it is possible to suppress a change of the torque caused by a change of the temperature.

Second Embodiment

Figure 2:
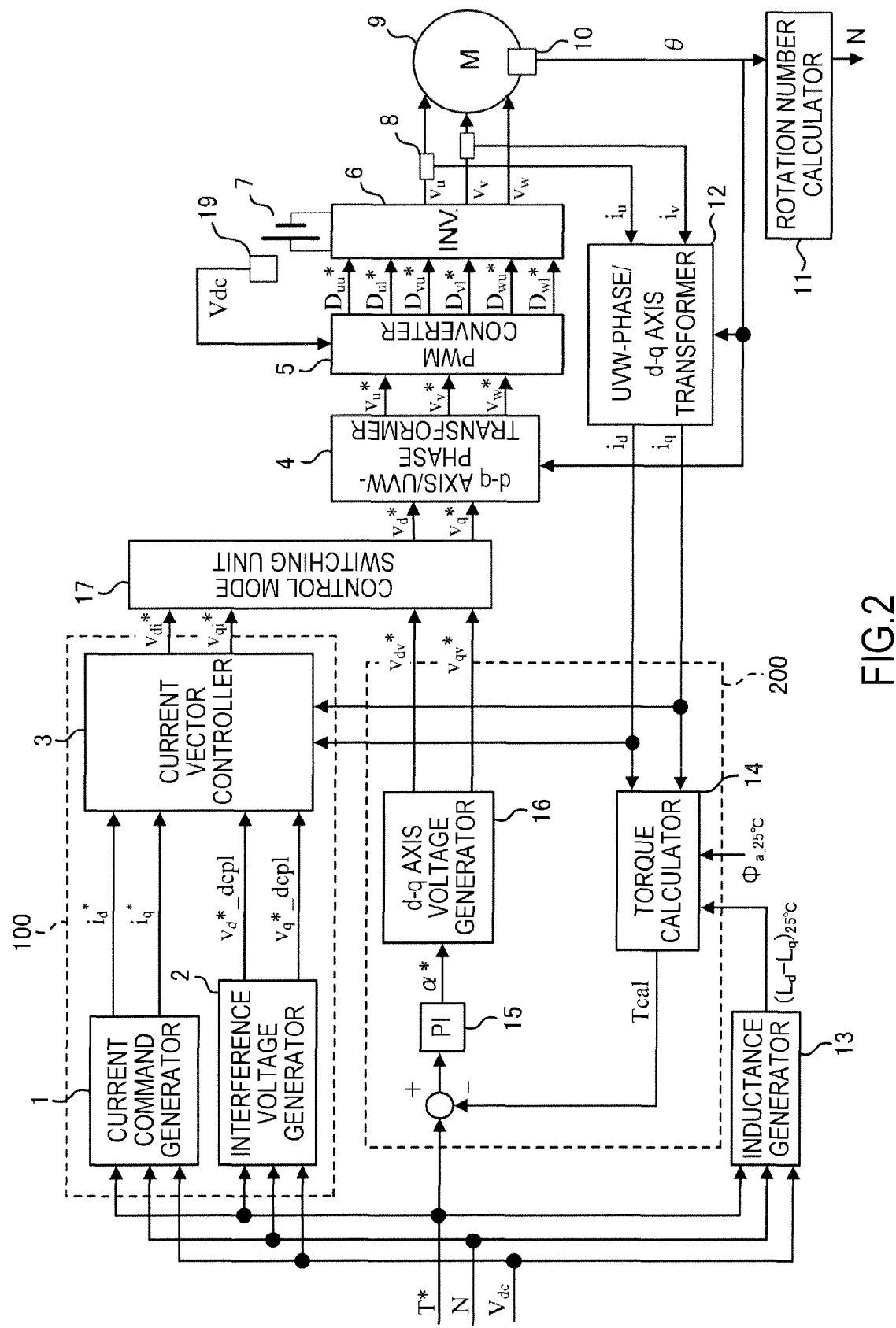
FIG. 2 is a control block diagram illustrating an electric motor control according to a second embodiment.

FIG. 2 is a control block diagram illustrating an electric motor control according to a second embodiment. This control is executed based on the flowchart described below.

According to the second embodiment, the magnet temperature tmp is set to a fixed value (25° C.), and an inductance generator 13 is provided instead of the motor constant generator 18. As a result, the computation performed in the current control unit 100 and the voltage phase control unit 200 is different from that of the first embodiment. Hereinafter, a description will focus on a difference from the first embodiment. It is noted that the temperature "25° C." is set based on a performance guarantee temperature or an ambient temperature of an operational environment in order to fix the magnet temperature tmp, and the invention is not limited thereto.

A description will now be made for the current control unit 100.

The current command generator 1 receives the torque command value T*, the rotation speed N, and the battery voltage $V_{dc}$ and generates and outputs the d-q axis current command values $i_{d*}$ and $i_{q*}$ in the case of "tmp=25° C." by referring to a table created in advance through experiment or computation. Similarly, the interference voltage generator 2 receives the torque command value T*, the rotation speed N, and the battery voltage $V_{dc}$ and generates and outputs the d-q axis interference voltage values $v_{d*\_dcpl}$, $v_{q*\_dcpl}$ in the case of "tmp=25° C." by referring to a table created in advance through experiment or computation. It is possible to reduce a computation load by using the table in this manner.

A description will now be made for the voltage phase control unit 200.

The torque calculator 14 receives the magnetic flux $\phi_{a\_25°\ C.}$ at "tmp=25° C." and the d-q axis inductance difference $(L_d-L_q)_{25°\ C.}$ at tmp=25° C. stored in advance and calculates an estimated torque based on these constants and the d-q axis current using formula (7).

$$T_{cal} = p\{\Phi_{a\_25°\ C.} + (L_d - L_q)_{25°\ C.} i_d\} i_q \tag{7}$$

The inductance generator 13 receives the torque command value T*, the rotation speed N, and the battery voltage $V_{dc}$ and generates and outputs the d-q axis inductance difference $(L_d-L_q)_{25°\ C.}$ by referring to a table created in advance through experiment or computation.

A description will now be made for the effects and advantages of the configuration described above.

Both the current control mode and the voltage phase control mode are based on a particular temperature condition (tmp=25° C.). Therefore, if the magnet temperature is deviated from this condition, an actual torque output is also deviated from the command value. However, a sensitivity of a torque change against a temperature change is equal between both the control modes. Therefore, it is possible to reduce a torque discontinuity at the time of the control mode switching.

The inductance generator 13 generates the motor constant using the torque command value T* of the electric motor 9. Since the torque of the electric motor 9 depends on the electric current, it is possible to generate the motor constant corresponding to dependence on the electric current of the electric motor inductance and thus improve the torque control accuracy.

Third Embodiment

Figure 3:
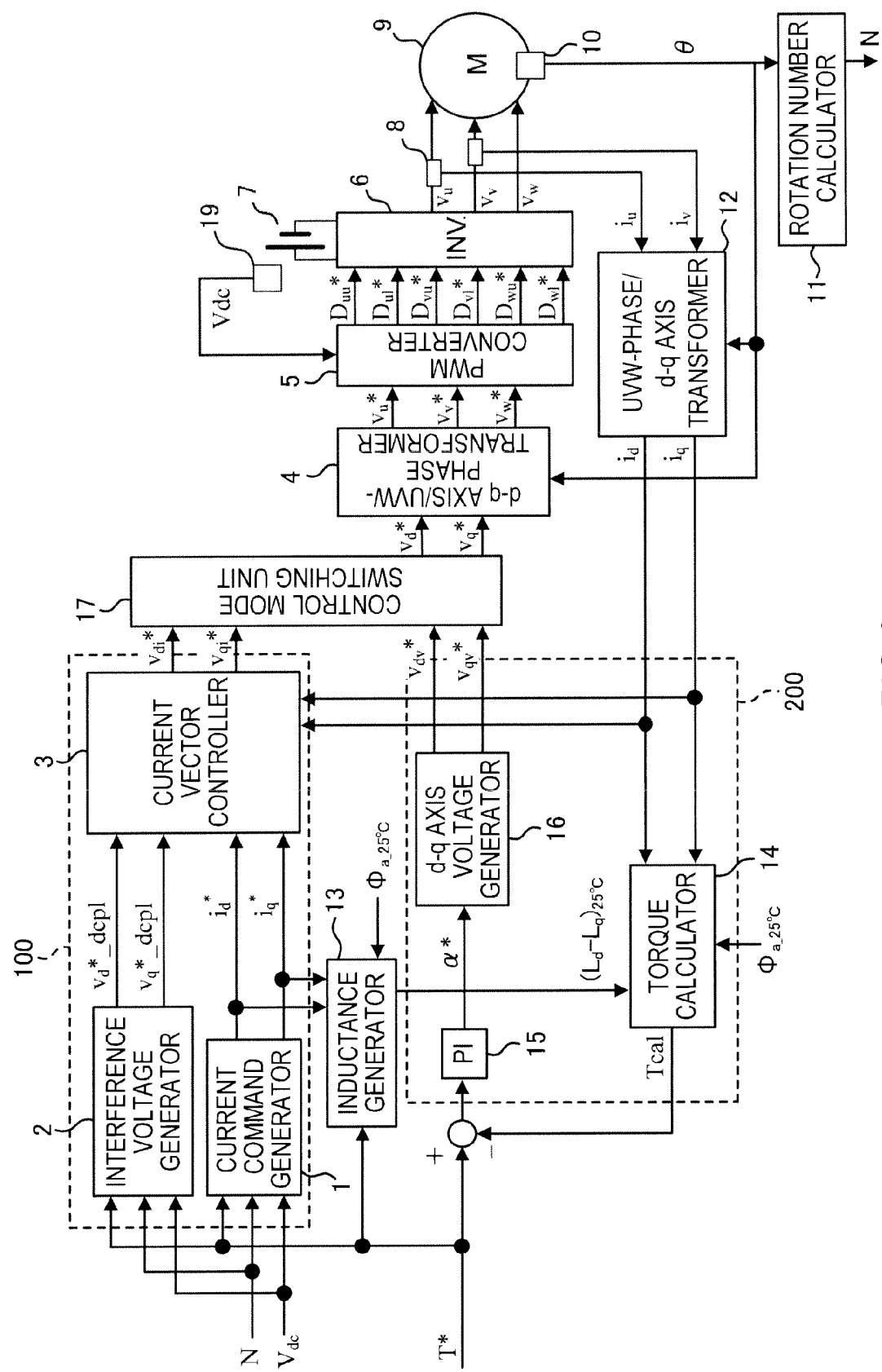
FIG. 3 is a control block diagram illustrating an electric motor control according to a third embodiment.

FIG. 3 is a control block diagram illustrating an electric motor control according to a third embodiment. This control is executed based on the flowchart described below.

Hereinafter, a description will focus on a difference from the second embodiment.

The current command generator 1 and the interference voltage generator 2 receive the torque command value T*, the rotation speed N, and the battery voltage $V_{dc}$ and generates and outputs the d-q axis current command values $i_{d*}$ and $i_{q*}$ and the d-q axis interference voltage values $v_{d\_dcpl}$, $v_{q*\_dcpl}$ at tmp=25° C. by referring to a table created in advance through experiment or computation. It is noted that, as a pre-requisite of the table creation, a modulation rate M* in a saturation area of the motor application voltage, that is, in a flux weakening area is equally set to the modulation rate M* used when the d-q axis voltage generator 16 calculates the d-q axis voltage command values $v_{dv*}$ and $v_{qv*}$ for the voltage phase control mode based on the voltage phase command value α*.

The inductance generator 13 calculates and outputs the d-q axis inductance difference $(L_d-L_q)_{25°\ C.}$ using formula (8) based on a relationship between the torque command value T* as an input of the current command generator 1 and the current command values $i_{d*}$ and $i_{q*}$ as an output of the current command generator 1.

$$(L_d - L_q)_{25°\ C.} = \frac{1}{i_d^*}\left(\frac{T^*}{pi_q^*} - \Phi_{a\_25°\ C.}\right) \tag{8}$$

That is, the inductance difference $(L_d-L_q)_{25°\ C.}$ is calculated using a table stored in the current command generator 1. The table stored in the current command generator 1 essentially represents a relationship between a torque, an electric current, and a magnetic flux and thus can be used to generate the inductance difference $(L_d-L_q)_{25°\ C.}$.

According to the third embodiment, the table is shared between the current command generator 1 and the inductance generator 13 as described above. Therefore, it is possible to reduce a memory capacity used to store the table.

Fourth Embodiment

Figure 4:
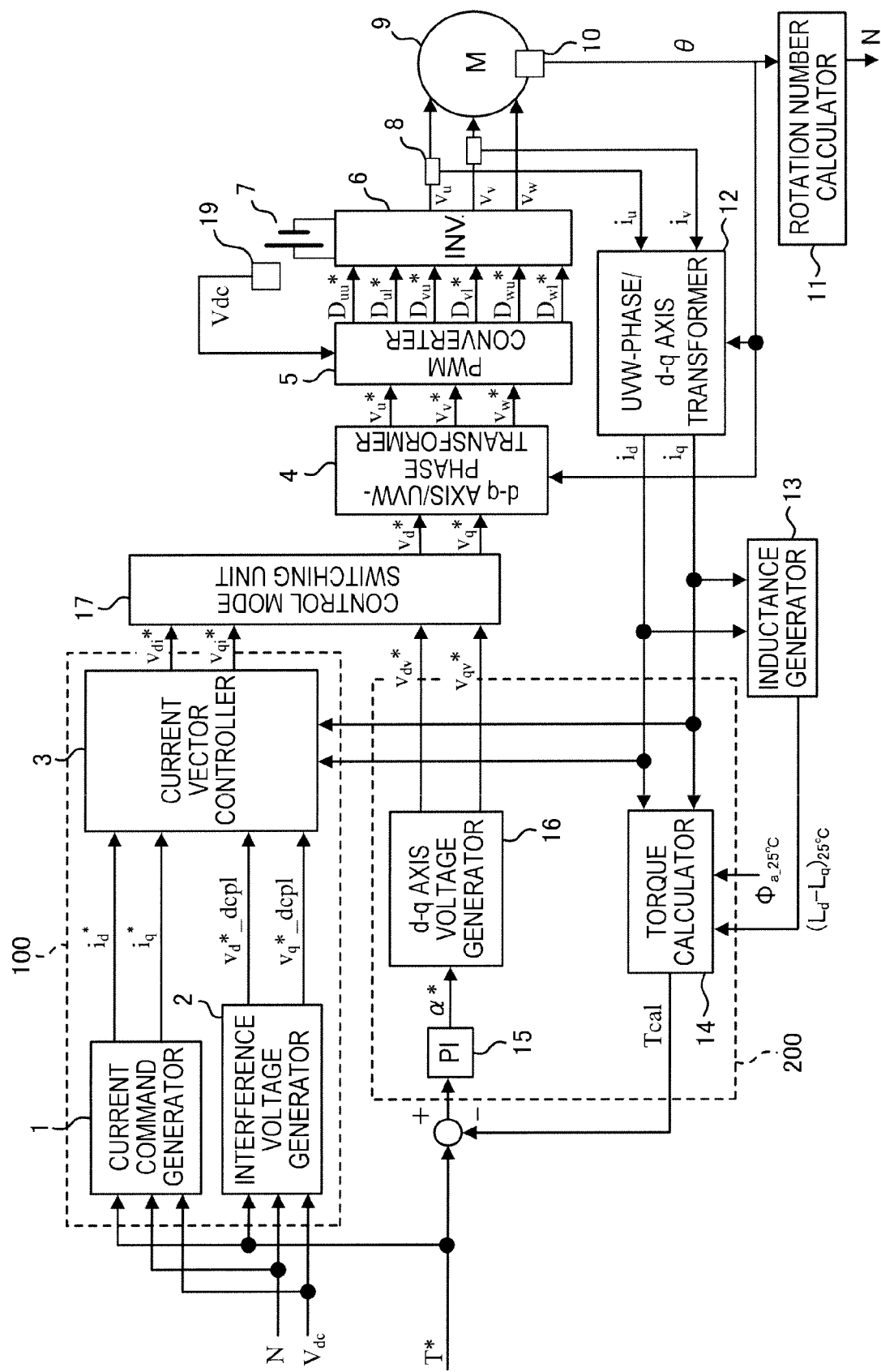
FIG. 4 is a control block diagram illustrating an electric motor control according to a fourth embodiment.

FIG. 4 is a control block diagram illustrating an electric motor control according to a fourth embodiment of this disclosure. This control is executed based on the flowchart described below.

The fourth embodiment is similar to the second embodiment except for the method of generating the inductance difference $(L_d-L_q)_{25°\ C.}$ in the inductance generator 13.

In the second embodiment, the inductance generator 13 generates the inductance difference $(Ld-Lq)_{25°\,C.}$ by referring to the table created by using the torque command value T*, the rotation speed N of the electric motor 9, and the battery voltage $V_{dc}$ as indices. However, since the inductance essentially depends on an electric current, the inductance difference $(Ld-Lq)_{25°\,C.}$ is generated by referring to a table created using the d-q axis current as an index according to the fourth embodiment. As a result, the torque calculator 14 estimates a torque using the inductance difference $(Ld-Lq)_{25°\,C.}$ obtained by referring to the magnetic flux $\phi_{a\_25°\,C.}$ at "tmp=25° C." stored in advance and the table representing a relationship between the electric current and the inductance stored in advance.

As a result, the number of indices to be referred is reduced as described above. Therefore, it is possible to simplify the computation.

Figure 5:
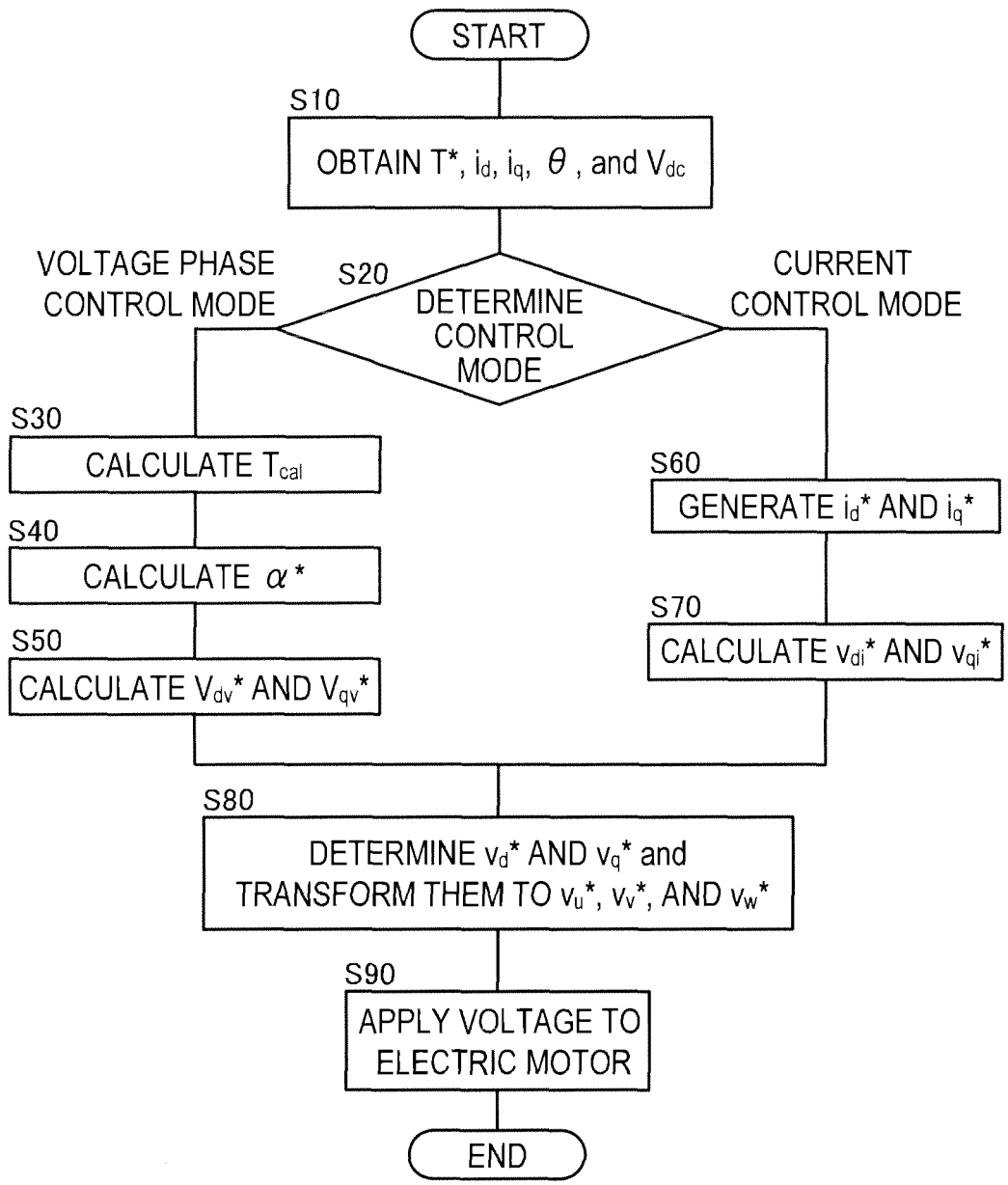
FIG. 5 is a flowchart illustrating a control routine common to the first to fourth embodiments.

FIG. 5 is a flowchart illustrating a control routine common to the first to fourth embodiments described above.

In step S10, the torque command value T*, the d-q axis current detection values $i_d$ and $i_q$, the electric angle θ, and the battery voltage detection value $V_{dc}$ are obtained. In step S20, the control mode switching unit 17 selects any one of the voltage phase control mode and the current control mode. Here, the voltage phase control mode is selected in a high rotation area where a flux weakening control is performed, and the current control mode is selected in other areas.

In the case of the voltage phase control mode, the process advances to step S30. In step S30, the torque calculator 14 calculates the torque estimation value $T_{cal}$ based on a predetermined magnet temperature tmp. In step S40, the torque controller 15 performs PI-amplification for the difference between the torque command value T* and the torque estimation value $T_{cal}$ and computes the voltage phase command value α*. In step S50, the d-q axis voltage generator 16 computes the d-q axis voltage command values $v_{dv*}$ and $v_{qv*}$ from the voltage phase command value α*.

Meanwhile, in the case of the current control mode, the process advances to step S60. In step S60, the current command generator 1 generates the current command values $i_{d*}$ and $i_{q*}$ based on a predetermined temperature tmp. In step S70, the current vector controller 3 calculates the d-q axis voltage command values $v_{di*}$ and $v_{qi*}$.

In step S80, the control mode switching unit 17 sets the d-q axis voltage command values of the control mode selected in step S20 as the voltage command values $v_d$ and $v_q$. In addition, the d-q axis/UVW-phase transformer 4 transforms the voltage command values $v_d$ and $v_q$ into the 3-phase AC voltage commands $v_{u*}$, $v_{v*}$, and $v_{w*}$.

In step S90, based on the 3-phase AC voltage commands $v_{u*}$, $v_{v*}$, and $v_{w*}$, the 3-phase AC voltage is applied to the electric motor 9 using the PWM converter 5 and the inverter 6.

Through steps S30 and S60 described above, it is possible to suppress a torque discontinuity at the time of the control mode switching without adding a new configuration to the current control mode known in the art.

Although various embodiments of this disclosure have been described hereinbefore, they are just for illustrative purposes and are not intended to specifically limit the technical scope of the invention. Instead, it would be appreciated that various changes or modifications may be possible without departing from the spirit and scope of the invention.

This application claims priority based on Japanese Patent Application No. 2012-057741 filed with the Japan Patent Office on Mar. 14, 2012, the entire contents of which are expressly incorporated herein by reference.

The invention claimed is:

1. An electric motor control device comprising:
   a motor constant generator configured to generate a motor constant by using a temperature as a parameter;
   a current control unit that has an electric current generator configured to generate a current command value to an electric motor based on at least a torque command value by referring to a table prepared in advance and that is configured to execute a current control mode in which a voltage applied to the electric motor is controlled to match the current command value;
   a torque calculator configured to calculate a torque estimation value of the electric motor based on a torque computation formula using the motor constant;
   a voltage phase control unit configured to execute a voltage phase control mode in which a feedback operation is performed for a voltage phase based on a difference between the torque estimation value and the torque command value; and
   a control mode switching unit configured to switch to the voltage phase control mode in a high rotation area where a flux weakening control is performed,
   wherein the electric current generator is configured to generate the current command value under the same temperature environment as the temperature parameter of the motor constant used when the torque calculator calculates the torque estimation value.

2. The electric motor control device according to claim 1, wherein the electric current generator generates the current command value to the electric motor based on the motor constant and the torque command value by referring to a table prepared in advance.

3. The electric motor control device according to claim 1, wherein the motor constant generator generates the motor constant by using, as a parameter, an electric current value of the electric motor in addition to the temperature.

4. The electric motor control device according to claim 1, wherein the table prepared in advance is a first table storing a relationship between a current command value and a torque of the electric motor at a predetermined temperature,
   the electric current generator generates the current command value using the first table in the current control mode,
   the motor constant generator has a second table storing a relationship between an electric current value and an inductance value at a predetermined temperature and is configured to generate the motor inductance value as the motor constant, and
   the torque calculator estimates a torque of the electric motor using a magnetic flux value prepared in advance at the predetermined temperature and the motor inductance value generated using the second table in the voltage phase control mode.

5. The electric motor control device according to claim 1, wherein the motor constant is obtained by using, as a parameter, a torque of the electric motor in addition to the temperature.

6. The electric motor control device according to claim 1, wherein the table prepared in advance is a first table storing a relationship between a current command value and a torque of the electric motor at a predetermined temperature,
   the electric current generator generates the current command value using the first table in the current control mode,
   the motor constant generator has a second table storing a relationship between a motor inductance value and a torque command value at a predetermined temperature and is configured to generate the motor inductance value as the motor constant, and the torque calculator estimates a torque of the electric motor using a magnetic flux value obtained in advance at the predetermined temperature and the motor inductance value generated by referring to the second table in the voltage phase control mode.

7. The electric motor control device according to claim 1, wherein the table prepared in advance is a first table storing a relationship between a current command value and a torque of the electric motor at a predetermined temperature, the electric current generator generates the current command value using the first table in the current control mode, and in the voltage phase control mode, the motor constant generator generates a motor inductance value as the motor constant based on a relationship between a torque command value as an input of the first table and an electric current value as an output of the first table, and the torque calculator estimates a torque of the electric motor using the generated motor inductance value and a magnetic flux value obtained in advance at the predetermined temperature.

8. The electric motor control device according to claim 1, wherein the temperature is a detected or estimated magnet temperature of the electric motor.

9. An electric motor control method comprising:

executing a current control mode in which a current command value to an electric motor is generated based on at least a torque command value by referring to a table prepared in advance, and a voltage applied to the electric motor is controlled to match the current command value;

executing a voltage phase control mode in which a torque estimation value of the electric motor is calculated based on a torque computation formula based on a motor constant obtained by using a temperature as a parameter, and a feedback operation is performed for a voltage phase based on a difference between the torque estimation value and the torque command value; and switching to the voltage phase control mode in a high rotation area where a flux weakening control is performed, wherein in generation of the current command value, the current command value under the same temperature environment as a temperature parameter of the motor constant used when the torque estimation value is calculated is generated.

10. An electric motor control device comprising:

a motor constant generation means for generating a motor constant by using a temperature as a parameter;

a current control means, that has an electric current generation means for generating a current command value to an electric motor based on at least a torque command value by referring to a table prepared in advance, for executing a current control mode in which a voltage applied to the electric motor is controlled to match the current command value;

a torque calculation means for calculating a torque estimation value of the electric motor based on a torque computation formula using the motor constant;

a voltage phase control means for executing a voltage phase control mode in which a feedback operation is performed for a voltage phase based on a difference between the torque estimation value and the torque command value; and a control mode switching means for switching to the voltage phase control mode in a high rotation area where a flux weakening control is performed, wherein the electric current generation means generates the current command value under the same temperature environment as the temperature parameter of the motor constant used when the torque calculation means calculates the torque estimation value.

* * * * *